United States Patent
Sato (10) Patent No.: US 12,510,967 B2
(45) Date of Patent: Dec. 30, 2025

(54) INPUT DEVICE APPLYING VIBRATIONS TO A TOUCH SURFACE DURING PRESSING AND RELEASING OPERATIONS

(71) Applicant: Alps Alpine Co., Ltd., Tokyo (JP)

(72) Inventor: Takashi Sato, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 89 days.

(21) Appl. No.: 18/499,505

(22) Filed: Nov. 1, 2023

(65) Prior Publication Data
US 2024/0061509 A1   Feb. 22, 2024

Related U.S. Application Data

(63) Continuation of application No. PCT/JP2022/010345, filed on Mar. 9, 2022.

(30) Foreign Application Priority Data

Jun. 14, 2021 (JP) .................................. 2021-098884

(51) Int. Cl.
  *G08B 6/00* (2006.01)
  *G06F 3/01* (2006.01)
  *G06F 3/041* (2006.01)

(52) U.S. Cl.
  CPC .............. *G06F 3/016* (2013.01); *G06F 3/041* (2013.01); *G06F 2203/04105* (2013.01)

(58) Field of Classification Search
  CPC ........... G06F 2203/04105; G06F 3/016; G06F 2203/04104; G06F 3/02; G06F 3/03547;

(Continued)

(56) References Cited

U.S. PATENT DOCUMENTS

| | | | |
|---|---|---|---|
| 7,832,126 B2 * | 11/2010 | Koellner | E02F 9/264 37/348 |
| 2009/0272201 A1 * | 11/2009 | Loeb | G01L 5/228 73/862.041 |

(Continued)

FOREIGN PATENT DOCUMENTS

| | | |
|---|---|---|
| JP | 2011-48669 A | 3/2011 |
| JP | 2012-59243 A | 3/2012 |
| JP | 2016-186757 A | 10/2016 |

OTHER PUBLICATIONS

International Search Report issued in the corresponding International Patent Application No. PCT/JP2022/010345; mailed on May 31, 2022 (total 2 pages).

*Primary Examiner* — Daniel Previl
(74) *Attorney, Agent, or Firm* — Harness, Dickey & Pierce, P.L.C.

(57) ABSTRACT

An input device includes a touch sensor, a detector that detects a load of a press on a touch surface of the touch sensor, a vibration applying section that vibrates the touch surface, a controller that issues an instruction for vibrating the touch surface to the vibration applying section when determining that the load detected by the detector exceeds a predetermined press reference, and a timer section that measures an elapsed time after it is determined that the load exceeds the predetermined press reference. The controller further determines whether to instruct the vibration applying section to vibrate the touch surface based on the elapsed time until it is determined that the load falls below a predetermined release reference.

5 Claims, 7 Drawing Sheets

(58) Field of Classification Search
CPC ........ G06F 3/038; G06F 3/0416; G06F 3/044; G06F 3/01; G06F 3/041; G06F 1/00; G06F 3/00; G06F 5/00; G06F 8/00; G06F 7/00; G06F 11/00; G06F 9/00; G06F 12/00; G06F 13/00; G06F 15/00; G06F 16/00; G06F 17/00; G06F 18/00; G06F 21/00; G06F 40/00; G06F 30/00; G06F 2101/00; G06F 2111/00; G06F 2113/00; G06F 2115/00; G06F 2117/00; G06F 2119/00; G06F 2123/00; G06F 2200/00; G06F 2201/00; G06F 2203/00; G06F 2205/00; G06F 2206/00; G06F 2207/00; G06F 2209/00; G06F 2211/00; G06F 2212/00; G06F 2213/00; G06F 2216/00; G06F 2218/00; G06F 2219/00; G06F 2221/00; B60K 2360/1434; B60K 2360/1438; B60K 35/10; B60K 35/22; B60K 35/25; B60K 1/00; B60K 3/00; B60K 5/00; B60K 6/00; B60K 7/00; B60K 8/00; B60K 11/00; B60K 13/00; B60K 15/00; B60K 16/00; B60K 17/00; B60K 20/00; B60K 23/00; B60K 25/00; B60K 26/00; B60K 28/00; B60K 31/00; B60K 35/00; B60K 2310/00; B60K 37/00; B60K 2360/00; B60K 2700/00; B60K 2702/00; B60K 2704/00
USPC ..... 340/407.1, 407.2, 815.48, 384.71, 393.3, 340/393.4
See application file for complete search history.

(56) References Cited

U.S. PATENT DOCUMENTS

| | | | |
|---|---|---|---|
| 2012/0154329 A1* | 6/2012 | Shinozaki | G06F 3/04886 345/174 |
| 2013/0291655 A1* | 11/2013 | Ohara | H03K 17/967 73/862.046 |
| 2017/0351353 A1* | 12/2017 | Takeuchi | G06F 3/016 |
| 2019/0227630 A1* | 7/2019 | Masamoto | B60K 35/22 |
| 2020/0166099 A1* | 5/2020 | Ikehara | G06F 3/016 |

* cited by examiner

INPUT DEVICE APPLYING VIBRATIONS TO A TOUCH SURFACE DURING PRESSING AND RELEASING OPERATIONS

CLAIM OF PRIORITY

This application is a Continuation of International Application No. PCT/JP2022/010345 filed on Mar. 9, 2022, which claims benefit of Japanese Patent Application No. 2021-098884 filed on Jun. 14, 2021. The entire contents of each application noted above are hereby incorporated by reference.

BACKGROUND OF THE INVENTION

1. Field of the Invention

The present invention relates to an input device.

2. Description of the Related Art

In general, a technique of detecting a press by an operator on a touch panel so that the press is processed as an input of a key or a button, such as a mechanical switch has been used. Specifically, the following technique has been proposed. That is, the touch panel is vibrated when the operator touches the touch panel with a finger and a physical tactile feedback on the input is given to the operator, thereby making the operator aware that the input has occurred.

In Japanese Unexamined Patent Application Publication No. 2011-48848, a technique of imparting vibration when a load of a predetermined reference or more is detected is proposed, for example. According to Japanese Unexamined Patent Application Publication No. 2011-48848, a key repeat is performed when the load of the predetermined reference is maintained.

Here, in the case of mechanical switches, the operator obtains tactile sensations twice, once when a press and once when release the press.

On the other hand, according to Japanese Unexamined Patent Application Publication No. 2011-48848, vibration is generated when a load of a predetermined reference or more is detected when the operator performs a press. However, it is not specifically described whether physical tactile feedback is provided when the load falls below the predetermined reference due to the release of the press performed by the operator after the load of the predetermined reference or more is detected. Therefore, when the operator releases the finger, the operator may feel strange because it is different from the conventional one in that tactile sensations are not obtained. Therefore, it is considered better to provide vibration when the load falls below the predetermined reference by releasing the press.

However, in a case where the assignment of vibration when the load falls below the predetermined standard is applied to a technique, such as that described in Japanese Unexamined Patent Application Publication No. 2011-48848, for determining whether the press has been performed based on whether the load is larger than the predetermined standard, when the finger of the operator shakes, etc., a state in which the load exceeds the predetermined reference and a state in which the load falls below the predetermined reference are alternately detected, so that the vibration is continuously performed, which causes discomfort to the operator.

SUMMARY OF THE INVENTION

The present invention provides an input device including a touch sensor, a detector that detects a load of a press on a touch surface of the touch sensor, a vibration applying section that vibrates the touch surface, a controller that issues an instruction for vibrating the touch surface to the vibration applying section when determining that the load detected by the detector exceeds a predetermined press reference, and a timer section that measures an elapsed time after it is determined that the load exceeds the predetermined press reference. The controller further determines whether to instruct the vibration applying section to vibrate the touch surface based on the elapsed time until it is determined that the load falls below a predetermined release reference.

According to an input device of an embodiment, an appropriate tactile sensation can be given to an operation of an operator.

DESCRIPTION OF THE PREFERRED EMBODIMENTS

Embodiments will be described hereinafter with reference to the drawings. In the embodiment below, an example of an input device will be described.

First Embodiment

Figure 1:
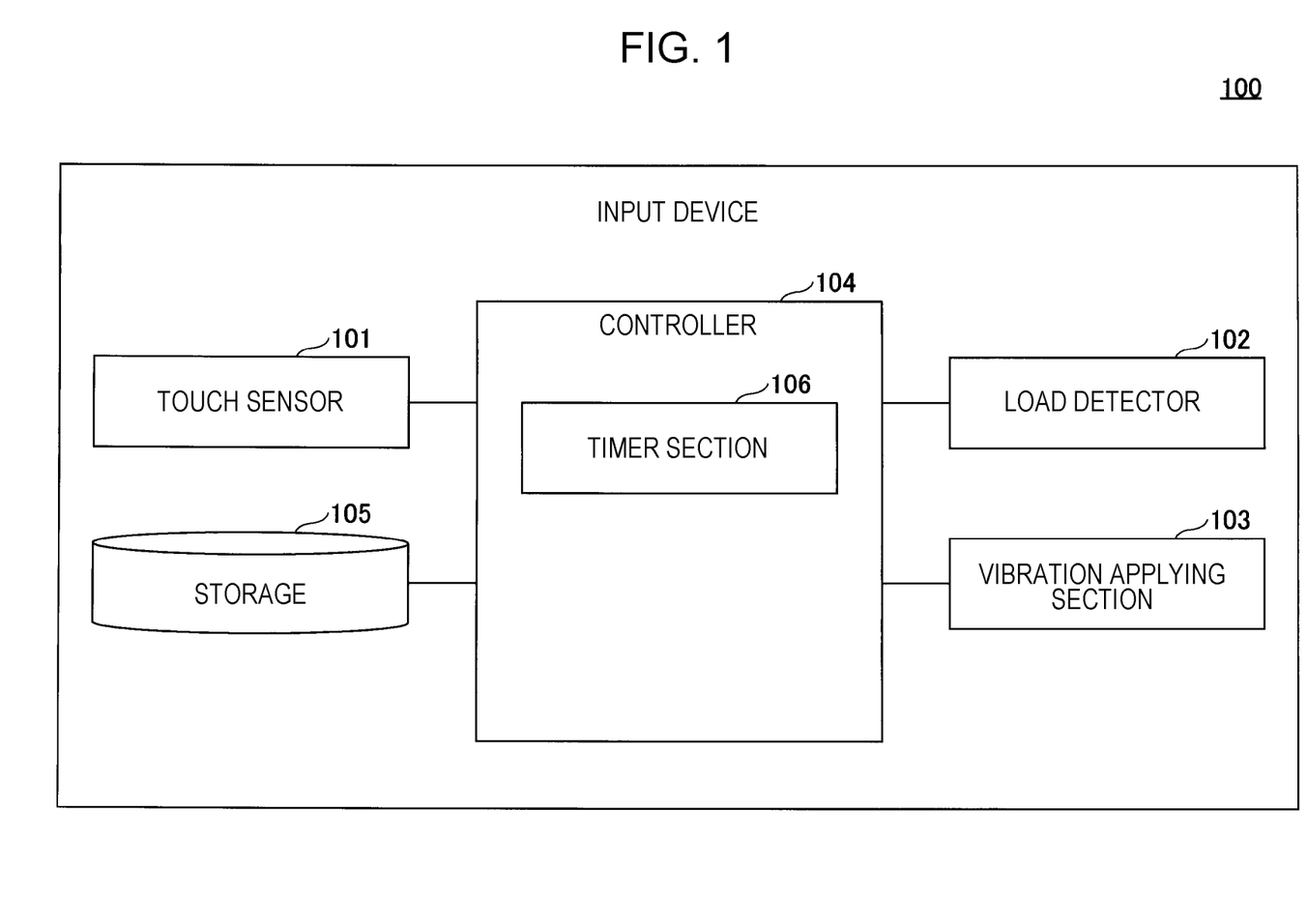
FIG. 1 is a block diagram illustrating a configuration of an input device according to a first embodiment.

FIG. 1 is a block diagram illustrating a configuration of an input device according to a first embodiment. As illustrated in FIG. 1, the input device 100 includes a touch sensor 101, a load detector 102, a vibration applying section 103, a controller 104, and a storage 105.

The input device 100 of this embodiment may be employed in any input device that accepts input of operations performed by an operator. Examples of the device in which the input device 100 is employed include an input device provided near a center panel of a car and a portable touchpad.

The storage 105 stores programs to be executed by the controller 104 and various parameters to be used by the controller 104 for control.

The touch sensor 101 is used to detect a pressed position on a touch surface of the input device 100. The touch sensor 101 may employ a capacitance method, for example, but other methods, such as a resistance film method or an optical method, may be used. The touch sensor 101 is formed into a film having a predetermined region corresponding to the touch surface of the input device 100.

The vibration applying section 103 vibrates the touch surface in response to an operation performed by the operator on the input device 100. For example, a solenoid, an eccentric motor, or a piezoelectric element may be considered to be used as the vibration applying section 103 according to this embodiment, but any configuration that may apply vibration may be used. Furthermore, the vibration applying section 103 may include a plurality of configurations.

Here, in the general mechanical push button switches using a spring made of domed metal or rubber, a click tactile sensation is often obtained when the operator presses and when the operator releases the press.

A load change in a specific mechanical push button switch will now be described. When the operator starts a press of the push button, a load associated with a finger of the operator and the push button increases in accordance with an amount of the press from the start of the press. Then the dome-shaped spring is inverted in response to the load, so that the load associated with the finger of the operator etc., is sharply reduced and a click tactile sensation is generated. Thereafter, the load is increased again while the operator continues to press the push button, and then the press of the push button is terminated. In this embodiment, vibration applied by the vibration applying section 103 gives a tactile sensation close to a change in the load. In this embodiment, a tactile sensation, on the finger of the operator, etc., obtained by the load when the push button is pressed, that is, a click tactile sensation when the push button is pressed is represented as a first tactile sensation.

Furthermore, when the push button is released, a change in the load opposite to the press occurs. Specifically, when the operator starts release of the press of the push button, a load associated with the finger of the operator and the push button reduces in accordance with the release of the press. Then the state of the push button is restored from the state in which the dome-shaped spring is inverted in accordance with the reduction of the load, so that the load associated with the finger of the operator etc., sharply increases and a click tactile sensation is generated. Thereafter, the load is reduced again while the operator continues to release the push button, and then the release of the press of the push button is terminated. In this embodiment, vibration applied by the vibration applying section 103 gives a tactile sensation close to a change in the load. In this embodiment, a tactile sensation, on the finger of the operator, etc., obtained by the load when the press of the push button is released, that is, a click tactile sensation at the time of release is represented as a second tactile sensation.

In other words, the click tactile sensation obtained by the operator pressing the mechanical push button corresponds to a pair of the first tactile sensation at the time of press and the second tactile sensation at the time of release. Then the first tactile sensation at the time of press and the second tactile sensation at the time of release are successively generated at an appropriate time interval. For this reason, for example, the operator feels uncomfortable when one of the first and second tactile sensations is generated a plurality of times by one press. Moreover, the operator feels uncomfortable even when the time interval between the first and second tactile sensations is too short or too long.

Therefore, even in this embodiment, the vibration applying section 103 performs control such that the operator may obtain a tactile sensation similar to that of a mechanical push button switch with a click tactile sensation, when the operator presses the touch sensor 101 and when the operator releases the press of the touch sensor 101. Note that conditions for applying vibration will be described below.

The load detector (example of the detector) 102 detects a load corresponding to a press performed by the operator on the touch surface of the touch sensor 101.

The controller 104 includes a timer section 106 and controls the entire input device 100. The controller 104 is a control circuit, for example, and performs various types of control by executing the programs stored in the storage 105.

The timer section 106 is configured to measure an elapsed time when a press or the like is performed by the operator, and a timer or the like is used, for example. For example, the timer section 106 measures an elapsed time t counted after the controller 104 determines that a load detected by the load detector 102 exceeds a predetermined press reference.

The predetermined press reference according to this embodiment is a reference for a press load for determining that the operator has performed pressing. In this embodiment, the controller 104 determines whether the load detected by the load detector 102 exceeds the threshold value Fth which is a press reference.

Figure 2:
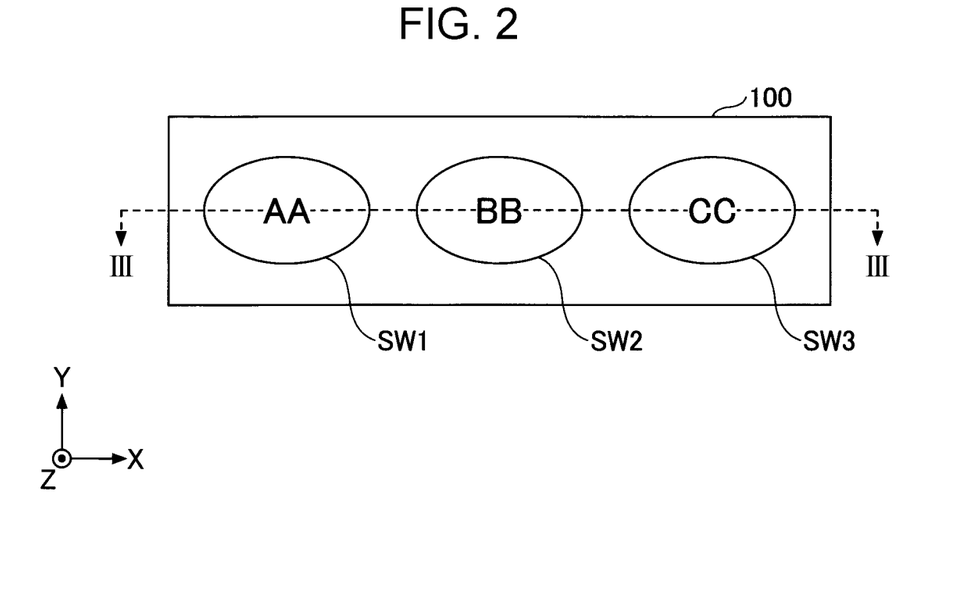
FIG. 2 is a diagram illustrating a top surface of the input device according to the first embodiment with a touch surface for accepting operations.

FIG. 2 is a diagram illustrating a top surface of the input device 100 according to this embodiment with the touch surface disposed for accepting operations. For convenience of explanation, an X-axis, a Y-axis, and a Z-axis are defined below as illustrated in FIG. 2. The touch surface 111 of the input device 100 illustrated in FIG. 2 has an XY plane with a first switch region SW1, a second switch region SW2, and a third switch region SW3. The input device 100 according to this embodiment performs processing provided that a switch is pressed when press loads for the first switch region SW1, the second switch region SW2, and the third switch region SW3 satisfy a predetermined press reference.

Figure 3:
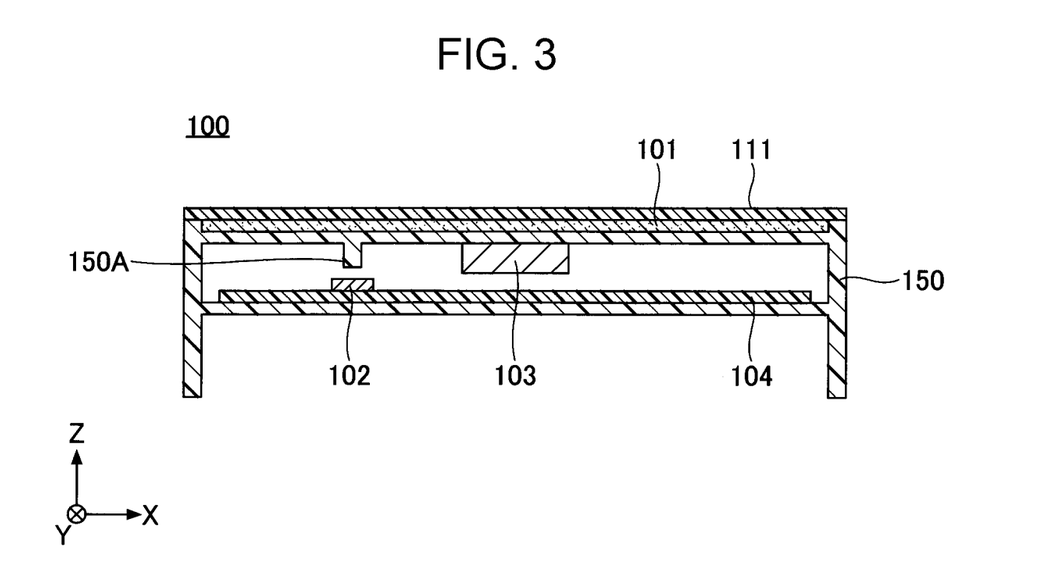
FIG. 3 is a cross-sectional view taken along a line III to III of FIG. 2 of the input device according to the first embodiment.

FIG. 3 is a cross-sectional view taken along a line III to III of FIG. 2 of the input device 100 according to the first embodiment. For convenience of explanation, an X-axis, a Y-axis, and a Z-axis are defined below as illustrated in FIG. 3. As illustrated in FIG. 3, the housing 150 of the input device 100 has the touch surface 111 on the top surface thereof in the Z-axis (height) direction. Then, on a side of a Z-axis negative direction (lower) of the touch surface 111, a touch sensor 101 is disposed. The touch sensor 101 has a region in the X-axis direction and the Y-axis direction that is substantially the same as the touch surface 111.

The touch sensor 101 of this embodiment has electrodes disposed in regions corresponding to the first switch region SW1, the second switch region SW2, and the third switch region SW3 on the touch surface 111. Then, when the operator performs a press-down operation, the operator touches the first switch region SW1, the second switch region SW2, or the third switch region SW3 on the touch surface 111. At this time, the touch sensor 101 detects a region pressed by the operator (for example, one or more of the first switch region SW1, the second switch region SW2, and the third switch region SW3) by measuring a change in capacitance associated with an approach or a touch by the operator. The touch sensor 101 outputs a signal indicating the detected region to the controller 104.

Note that the touch sensor 101 according to this embodiment is not limited to an example in which electrodes are disposed on the regions corresponding to the first switch region SW1, the second switch region SW2, and the third switch region SW3, and an electrode pattern may be disposed vertically and horizontally in a matrix form. In this case, the touch sensor 101 outputs position information indicating a coordinate on the XY plane which indicates a pressed position to the controller 104. On the other hand, the controller 104 holds position information in the XY plane corresponding to the first switch region SW1, the second switch region SW2, and the third switch region SW3. Thus, the controller 104 may identify a pressed region (e.g., the first switch region SW1, the second switch region SW2, or the third switch region SW3) using the input position information.

In addition, in the input device 100, the vibration applying section 103 is disposed on a side in the Z-axis positive direction (upper side where the touch surface 111 exists) in a space provided inside the housing 150. Then, when the vibration applying section 103 is vibrated, tactile feedback may be provided to the finger of the operator or the like touching the touch surface 111.

Furthermore, the housing 150 has a convex portion 150A on a (upper) side in the Z-axis positive direction facing the load detector 102 in the interior space. Then, when the touch surface 111 of the input device 100 is pressed by the operator, the convex portion 150A moves in the Z-axis negative direction (downward), since the upper surface (surface on which the touch surface 111 is disposed) of the housing 150 flexes in the Z-axis negative direction (downward direction).

A non-contact type distance sensor is typically used as the load detector 102. Specifically, the load detector 102 according to this embodiment detects a movement amount in the Z-axis negative direction (downward) of the convex portion 150A and outputs a signal indicating the detected movement amount to the controller 104. The controller 104 according to this embodiment processes the input signal as a signal indicating a load of a press performed by the operator. Thus, although the case where the amount of movement in the Z-axis negative direction (downward) of the convex portion 150A is processed as a press load is described in this embodiment, a detection of the press load is not limited to a method for detecting the amount of movement in the Z-axis negative direction (downward) of the convex portion 150A. For example, a pressure (strain) sensor or the like may be used to detect a load of an actual press by the operator.

In addition, although the load detector 102 has been described as an example of a detector in this embodiment, the detection is not limited to the detection of a load as long as an operation of applying pressure to the touch surface 111 performed by the operator, i.e., a press operation (press-down operation) is detected. As the detector, a detection may be performed based on an amount of displacement of the touch surface 111 caused by a press or based on a touched area on the touch surface 111 touched by the operator. Then, when the amount of displacement exceeds a predetermined displacement amount, or when the touched area on the touch surface 111 exceeds a predetermined area, the controller 104 may determine that a press operation has been performed.

Although the example in which the touch sensor 101 corresponding to the touch surface 111 is disposed has been described in this embodiment, the present invention is not limited to the example in which the touch sensor 101 corresponding to the touch surface 111 is disposed as described above, and for example, the touch sensor 101 may be disposed on a liquid crystal panel or the like.

Figure 4:
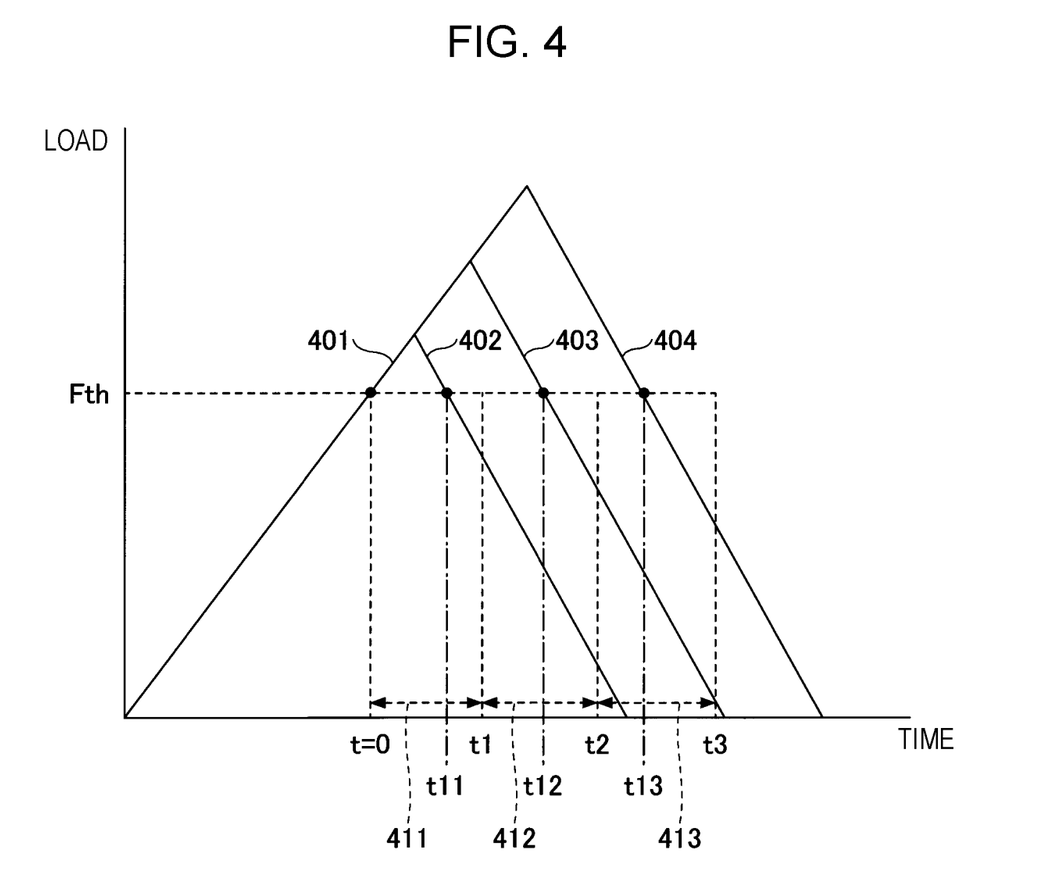
FIG. 4 is a diagram illustrating a change in a press load detected by a load detector of the input device according to the first embodiment in accordance with a press by an operator.

FIG. 4 is a diagram illustrating a change in a press load detected by the load detector 102 of the input device 100 according to this embodiment in accordance with a press by the operator. An axis of ordinates indicates a load (force) and an axis of abscissae indicates time in FIG. 4.

In the example illustrated in FIG. 4, a line 401 indicates an increase in a press load in response to a press performed by the operator on the touch surface 111. The lines 402 to 404 indicate reduction in the press load in accordance with a release of the press performed by the operator after the press load is increased. In the example illustrated in FIG. 4, the reduction in the press load is illustrated by the three lines 402 to 404 according to a difference in a timing of release of a press.

In the example illustrated in FIG. 4, a threshold value Fth is set as a predetermined press reference for detecting a press load. Therefore, the controller 104 of this embodiment determines whether a press load detected by the load detector 102 exceeds the threshold value Fth serving as the press reference for determining whether a press has been performed (presence or absence of the press).

Then, the controller 104 performs processing provided that the predetermined region (first switch region SW1, second switch region SW2, or third switch region SW3) corresponding to the position information detected by the touch sensor 101 has been pressed when it is determined that the press load detected by the load detector 102 exceeds the threshold value Fth.

Specifically, the controller 104 identifies the predetermined region (first switch area SW1, second switch area SW2, or third switch area SW3) pressed by the operator based on a signal input by the touch sensor 101 when determining that the press load exceeds the threshold value Fth. Thereafter, the controller 104 outputs an ON signal indicating that the identified region has been pressed to the external device. Accordingly, the external device may perform processing corresponding to the operation input by the input device 100. Furthermore, the controller 104 instructs the vibration applying section 103 to vibrate the touch surface 111 when determining that the press load exceeds the threshold value Fth.

In this way, the controller 104 according to this embodiment instructs the vibration applying section 103 to vibrate the touch surface 111 when determining that the press load detected by the load detector 102 exceeds a predetermined press reference (for example, the press load exceeds the threshold value Fth).

Furthermore, in the input device 100 of this embodiment, after it is determined that the press load exceeds the threshold value Fth, it is determined whether the press load satisfies a predetermined release reference.

The predetermined release reference according to this embodiment is a reference for a press load for determining that a press performed by the operator is released. In this embodiment, the controller 104 determines whether the load detected by the load detector 102 falls below the threshold value Fth which is the release reference.

In this embodiment, the same value is used for the threshold value Fth for determining that a press has been performed and the threshold value Fth for determining that press has been released. Since the same value is used for detecting the press and detecting the release after the press in this embodiment, the process may be simplified and burdens of the process and implementation may be reduced.

Then, the controller 104 determines whether to instruct the vibration applying section 103 to vibrate the touch surface 111 based on the elapsed time t until it is determined that the press load falls below the predetermined release reference (less than the threshold value Fth).

In this embodiment, the elapsed time t between a time when it is determined that the press load exceeds the predetermined press reference and a time when it is determined that the press load falls below the predetermined release reference is also referred to as a press time or a press-down time.

As described above, the input device 100 of this embodiment vibrates the touch surface 111 when the operator presses the touch surface 111, and also vibrates the touch surface 111 when the user releases the press of the touch surface 111. In addition, the vibration applying section 103 may vary a frequency and an amplitude, etc. between the vibration when the touch surface 111 is pressed and the vibration when the press of the touch surface 111 is released. As a result, the operator may obtain the first tactile sensation at the time of press and the second tactile sensation at the time of release.

However, when a finger of the operator shakes, and therefore, the determination that the press load exceeds the threshold value Fth and the determination that the press load falls below the threshold value Fth are repeatedly performed, vibration control is overlapped a plurality of times. In this case, since the operator obtains the first tactile sensation and the second tactile sensation a plurality of times in an overlapping manner, the operator feels uncomfortable.

Therefore, the controller 104 of this embodiment does not perform the vibration of the touch surface 111 when a period of time (press-down time) from when the operator presses the touch surface 111 to when the operator releases the touch surface 111 is short.

In order to perform the control, the storage 105 of this embodiment stores information indicating whether an instruction for vibration control is to be issued for the press-down time. For example, the storage 105 stores in advance a first vibration mask period 411 for not instructing vibration of the touch surface, a vibration control period 412 for instructing vibration of the touch surface after the first vibration mask period 411, and a second vibration mask period 413 for not instructing vibration of the touch surface after the vibration control period 412.

As illustrated in FIG. 4, the timer section 106 starts counting the elapsed time t using a time point '0' at which the press load exceeds the threshold value Fth as a start time. The timer section 106 measures the press-down time until the press load falls below the threshold value Fth after the counting of the elapsed time t is started. Next, a time zone serving as a reference for switching a process will be described.

In an example illustrated in FIG. 4, an elapsed time from "0" to t1 (hereinafter referred to as a first reference time t1) corresponds to the first vibration mask period 411, an elapsed time from t1 to t2 (hereinafter referred to as a second reference time t2) corresponds to the vibration control period 412, and an elapsed time from t2 to t3 (hereinafter referred to as an termination reference time t3) corresponds to the second vibration mask period 413. The first vibration mask period 411 and the second vibration mask period 413 are time zones for suppressing (not performing) the vibration control. Then, the vibration control period 412 is a time zone during which the vibration control is performed. Note that the first reference time t1, the second reference time t2, and the termination reference time t3 are appropriately set according to an implementation mode.

In this way, the controller 104 determines one of the first vibration mask period 411, the vibration control period 412, and the second vibration mask period 413 which includes the measured press-down time, and determines whether to issue a vibration instruction according to a determination result.

Specifically, as a result of a decrease in the press load as indicated by the line 402, the elapsed time t is included in the first vibration mask period 411, and when determining that the press load falls below the threshold value Fth (a time point t11, for example), the controller 104 does not issue an instruction for vibrating the touch surface 111 to the vibration applying section 103. As a result, overlap between the first tactile sensation and the second tactile sensation may be suppressed even the case where the press load exceeds the threshold value Fth and the case where the press load falls below the threshold value Fth are repeated due to some reason, such as finger shaking.

Furthermore, as a result of a decrease in the press load as indicated by the line 403, the elapsed time t is included in the vibration control period 412, and when determining that the press load falls below the threshold value Fth (a time point t12, for example), the controller 104 issues an instruction for vibrating the touch surface 111 to the vibration applying section 103. As a result, the operator may obtain the first tactile sensation at the time of press and the second tactile sensation at the time of release.

Furthermore, as a result of a decrease in the press load as indicated by the line 404, the elapsed time t is included in the second vibration mask period 413, and when determining that the press load falls below the threshold value Fth (a time point t13, for example), the controller 104 does not issue an instruction for vibrating the touch surface 111 to the vibration applying section 103. That is, when a period of time until the press load falls below the threshold value Fth is too long, the process is terminated without supplying a tactile feedback upon release.

In addition, when the controller 104 determines that the press load does not fall below the threshold value Fth by the time when the controller 104 determines that the elapsed time t reaches a termination reference time t3 (the second vibration mask period 413 has elapsed), it is deemed to an error state and the measurement of the elapsed time t performed by the timer section 106 is terminated before the process is terminated.

Furthermore, the controller 104 according to this embodiment controls not to perform a next press detection (determining whether the press load exceeds the threshold value Fth) until a predetermined period of time (hereinafter referred to as a detection suppression period t4) elapses after determining that the press performed by the operator has been released. Note that the detection suppression period t4 is preset as a period to suppress (not perform) a detection of a next press after a preceding press is released, and the period is set according to an implementation.

As described above, when the controller 104 determines that the press load has fallen below the threshold value Fth within the first vibration mask period 411 (for example, the time point t11), such as when the finger of the operator or the like is shaking, the controller 104 does not instruct the vibration applying section 103 to vibrate the touch surface 111. However, since the state in which the press load exceeds the threshold value Fth and the state in which the press load falls below the threshold value Fth are alternately repeated, the controller 104 makes the determination that the press load exceeds the threshold value Fth a plurality of times.

In this way, when no special control is performed in a situation in which a determination that the press load exceeds the threshold value Fth is made a plurality of times, a number of vibration control operations and a number of outputs of an ON signal corresponding to the number of times the determination is made are performed. Since such control is considered to be unintentional control of the operator, the operator feels uncomfortable. Therefore, in the input device 100 according to this embodiment, in order to suppress (avoid) such a situation, the controller 104 controls not to perform a next press detection until the detection suppression period elapses after determining that the operator has released the press with the finger or the like.

Figure 5:
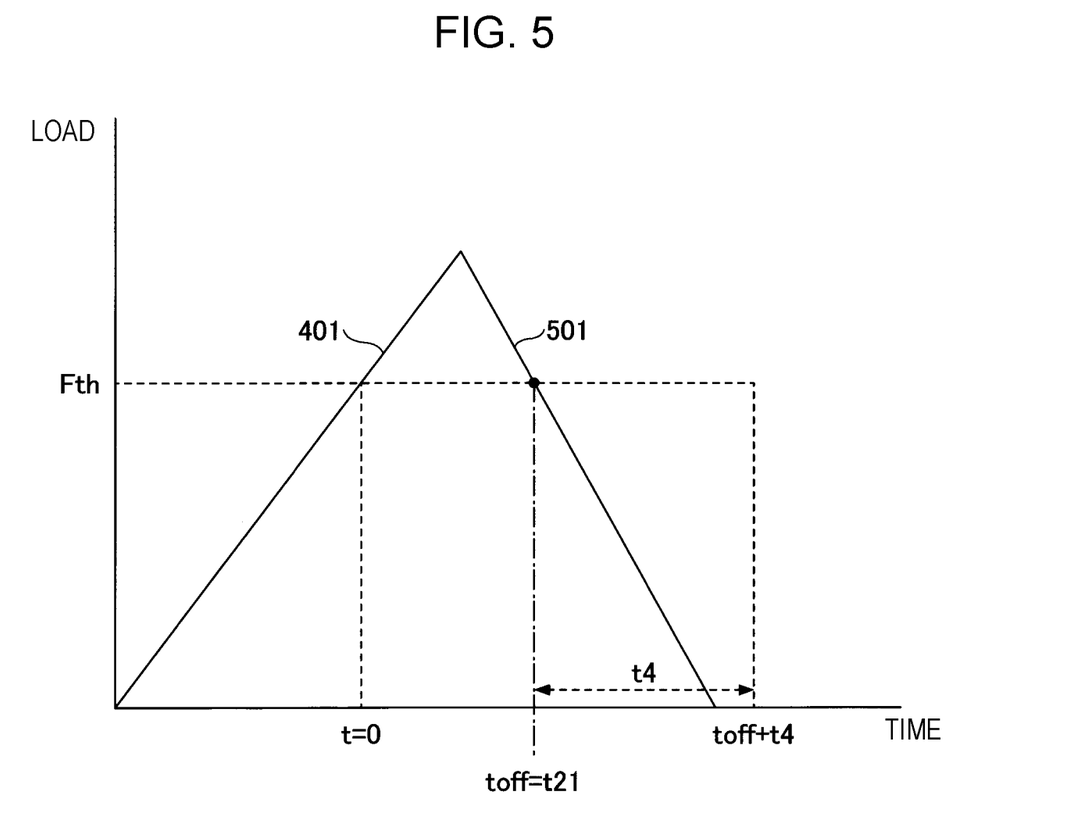
FIG. 5 is a diagram illustrating a detection suppression period used for control by the input device according to the first embodiment.

FIG. 5 is a diagram illustrating the detection suppression period used for control by the input device 100 according to this embodiment. In the example illustrated in FIG. 5, an increase in a press load in response to a press by the operator is denoted by the line 401. After the press load increases, a reduction of the press load corresponding to a release of the press by the finger or the like on the touch surface 111 by the operator is indicated by a line 501. In the input device 100 according to this embodiment, the following control is performed regardless of whether a time point when the press load falls below the threshold value Fth on the line 501 showing the reduction of the press load is included in the first vibration mask period 411, the vibration control period 412, or the second vibration mask period 413.

In the example illustrated in FIG. 5, when the controller 104 determines that the press load has fallen below the threshold value Fth, an elapsed time t21 at which it is determined that the press load has fallen below the threshold value Fth is set as a release detection time toff.

Then, the controller 104 does not determine whether the press load due to a next press of the first press is input to the touch surface 111 (whether the press load exceeds the touch sensor threshold value Fth) until the detection suppression period t4 has elapsed after the time point when it is determined that the load due to the first press satisfies a predetermined release reference (release detection time toff). Accordingly, when the finger or the like is shaking, a situation where the vibration of the touch surface 111 continues is suppressed (avoided) and also a situation where an ON signal is output a plurality of times is suppressed (avoided).

Figure 6:
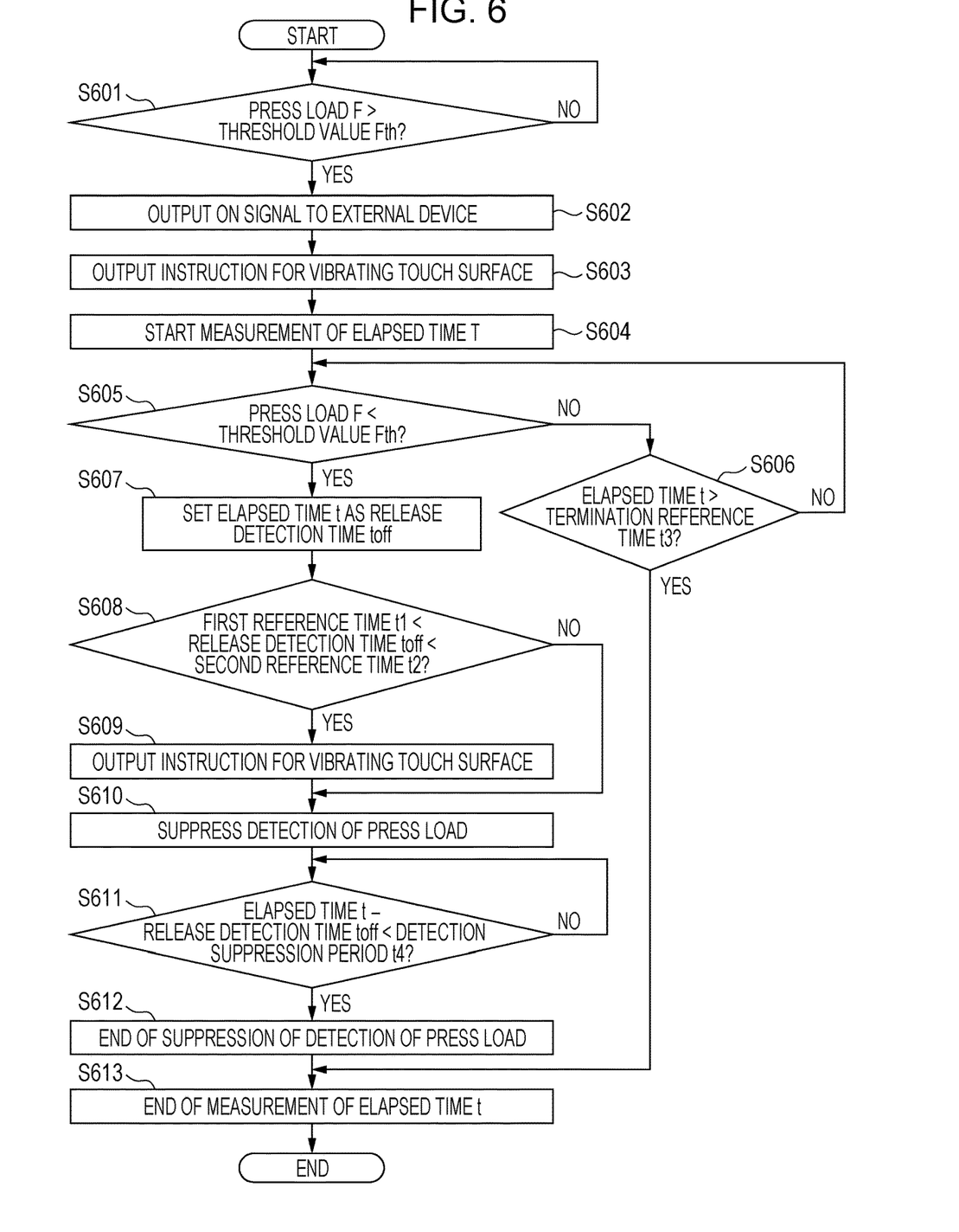
FIG. 6 is a flowchart of overall control performed by the controller according to the first embodiment.

FIG. 6 is a flowchart of overall control performed by the controller 104 according to this embodiment.

First, the controller 104 determines whether a press load F detected by the load detector 102 exceeds the threshold value Fth (S601). The controller 104 repeats a process in S601 when determining that the press load F is equal to or less than the threshold value Fth (S601: No).

On the other hand, when determining that the press load F exceeds the threshold value Fth (S601: Yes), the controller 104 outputs an ON signal to the external device indicating that a predetermined region (first switch region SW1, second switch region SW2, or third switch region SW3) corresponding to information on a position in which the press load F is detected has been pressed (S602).

The controller 104 outputs an instruction for vibrating the touch surface 111 to the vibration applying section 103 (S603). Accordingly, the vibration applying section 103 vibrates the touch surface 111 in response to the input instruction.

The controller 104 causes the timer section 106 to start measuring the elapsed time t (S604).

The controller 104 determines whether the press load F detected by the load detector 102 falls below the threshold value Fth (S605). When determining that the press load F is equal to or greater than the threshold value Fth (not less than the threshold value Fth) (S605: No), the controller 104 determines whether the elapsed time t exceeds the termination reference time t3 (S606).

Then, when determining that the elapsed time t exceeds the termination reference time t3 (S606: Yes), the controller 104 terminates the measurement of the elapsed time t performed by the timer section 106 (S613) and terminates the process. On the other hand, when determining that the elapsed time t does not exceed the termination reference time t3 (S606: No), the controller 104 returns the process to S605.

Also, in S605, when determining that the press load F has fallen below the threshold value Fth (S605: Yes), the controller 104 sets the elapsed time t at which it is determined that the press load F has fallen below the threshold value Fth as the release detection time toff (S607).

Then, the controller 104 determines whether an inequation "first reference time t1<release detection time toff<second reference time t2" is satisfied (S608). When it is determined that the inequation "the first reference time t1<release detection time toff<second reference time t2" is not satisfied (S608: No), the process proceeds to S610.

On the other hand, when determining that the inequation "first reference time t1<release detection time toff<second reference time t2" is satisfied (S608: Yes), the controller 104 outputs an instruction for vibrating the touch surface 111 to the vibration applying section 103 (S609). As a result, the vibration applying section 103 vibrates the touch surface 111.

Subsequently, the controller 104 executes control to suppress detection of the press load F by the load detector 102 (S610). Consequently, even when the operator presses the touch surface 111, the press load F is not detected.

Then, the controller 104 determines whether the "elapsed time t−release detection time toff" has exceeded the detection suppression period t4 (S611). When the determination is negative (S611: No), control to suppress detection of the press load F is continued.

On the other hand, when determining that the "elapsed time t−release detection time toff" has exceeded the detection suppression period t4 (S611: Yes), the controller 104 terminates the control to suppress the detection of the press load F by the load detector 102 (S612).

Thereafter, the controller 104 terminates the measurement of the elapsed time t by the timer section 106 (S613) and terminates the process.

By performing the control described above, the controller 104 of this embodiment may provide a click tactile sensation like a mechanical push button when the operator presses a predetermined region at an appropriate timing and releases the press.

In the input device 100 according to this embodiment, a processing burden of the determination may be reduced by determining the detection of the press and the detection of the release of the press by the single threshold value Fth. In addition, even in the control using one threshold value Fth, when the finger etc. shakes, tactile feedback in accordance with intension of the operator may be given by switching the vibration control in accordance with an elapsed time between the detection of press and the detection of releasing of the press.

Second Embodiment

In the foregoing embodiment, the example of using the threshold value Fth is described. Specifically, when the press load F exceeds the threshold value Fth, it is determined that the press has been performed, and when the press load F falls below the threshold value Fth, it is determined that the press has been released. However, the embodiment described above is not limited to the case of a single threshold. Therefore, in a second embodiment, an example in which a threshold value for detecting a press and a threshold value for detecting a release are different from each other will be described. Note that the same reference numerals are assigned to the same components as the first embodiment in an input device 100 according to this embodiment, and descriptions thereof are omitted.

Figure 7:
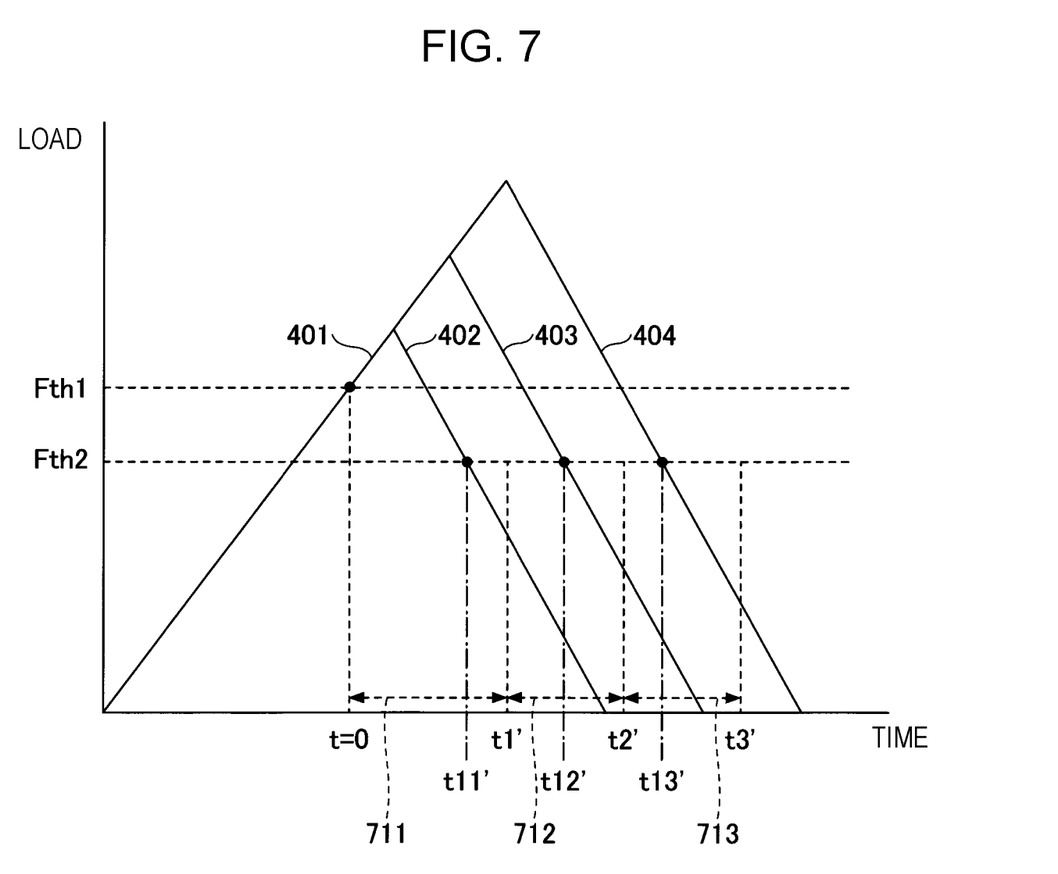
FIG. 7 is a diagram illustrating a change in a press load detected by a load detector of an input device according to a second embodiment in accordance with a press by an operator.

FIG. 7 is a diagram illustrating a change in a press load detected by a load detector 102 of the input device 100 according to this embodiment in accordance with a press of an operator. An axis of ordinates indicates a load (force) and an axis of abscissae indicates time in FIG. 7. In the example illustrated in FIG. 7, as in FIG. 4, an increase in a press load is indicated by a line 401, and a decrease in the press load is indicated by lines 402 to 404.

In the example illustrated in FIG. 7, as predetermined references for detecting a press load, a first threshold value Fth1 is set as a press reference to determine whether a press has been performed and a second threshold value Fth2 is set as a release reference to determine whether the press is released. Note that, in this embodiment, a value higher than the second threshold value Fth2 is set for the first threshold value Fth1.

Then, the controller 104 performs processing provided that the predetermined region (first switch region SW1, second switch region SW2, or third switch region SW3) corresponding to the position information detected by the touch sensor 101 has been pressed when it is determined that the press load detected by the load detector 102 exceeds the first threshold value Fth1.

Specifically, when determining that the press load exceeds the first threshold value Fth1, the controller 104 identifies a predetermined region pressed by the operator based on a signal supplied from the touch sensor 101 and outputs an ON signal indicating that the identified predetermined region has been pressed to an external device. Furthermore, the controller 104 instructs a vibration applying section 103 to vibrate a touch surface 111.

Moreover, in the input device 100 of this embodiment, after determining that the press load exceeds the first threshold value Fth1, the controller 104 determines whether to instruct the vibration applying section 103 to vibrate the touch surface 111 based on a press time until the press load becomes smaller than the second threshold value Fth2.

Therefore, a storage 105 according to this embodiment stores in advance a first vibration mask period 711 for not instructing vibration of the touch surface, a vibration control period 712 for instructing vibration of the touch surface after the first vibration mask period 711, and a second vibration mask period 713 for not instructing vibration of the touch surface after the vibration control period 712.

As illustrated in FIG. 7, a timer section 106 starts counting an elapsed time t using a time point '0' at which the press load exceeds the first threshold value Fth1 as a start time.

In an example illustrated in FIG. 7, an elapsed time from 0' to t1' (hereinafter referred to as a first reference time t1') corresponds to the first vibration mask period 711, an elapsed time from t1' to t2' (hereinafter referred to as a second reference time t2') corresponds to the vibration control period 712, and an elapsed time from t2' to t3' (hereinafter referred to as an termination reference time t3') corresponds to the second vibration mask period 713.

Note that, the first vibration mask period 711, the vibration control period 712, and the second vibration mask period 713 of this embodiment are different from the first vibration mask period 411, the vibration control period 412, and the second vibration mask period 413 of the first embodiment, respectively, in that they are set as periods from a time when the press load exceeds the first threshold value Fth1 to a time when the press load falls below the second threshold value Fth2.

Specifically, when it is determined that the elapsed time is included in the first vibration mask period 711 and the press load falls below the second threshold value Fth2 (a time point t11', for example) as a result of a decrease in the press load as indicated by the line 402, the controller 104 does not issue an instruction for vibrating the touch surface 111 to the vibration applying section 103.

Furthermore, when it is determined that the elapsed time is included in the vibration control period 712 and the press load falls below the second threshold value Fth2 (a time point t12', for example) as a result of a decrease in the press load as indicated by the line 403, the controller 104 issues an instruction for vibrating the touch surface 111 to the vibration applying section 103.

Moreover, when it is determined that the elapsed time is included in the second vibration mask period 713 and the press load falls below the second threshold value Fth2 (a time point t13', for example) as a result of a decrease in the press load as indicated by the line 404, the controller 104 does not issue an instruction for vibrating the touch surface 111 to the vibration applying section 103.

In addition, when the controller 104 determines that the press load does not fall below the second threshold value Fth2 before determining that the elapsed time t exceeds the termination reference time t3', the process is terminated.

Furthermore, as with in the first embodiment, the controller 104 according to this embodiment controls not to perform a next press detection until a detection suppression period t4 has elapsed after determining that the operator has released the press with the finger or the like. Note that the detection suppression period t4 is the same as that in the first embodiment, and therefore, a description thereof is omitted.

Figure 8:
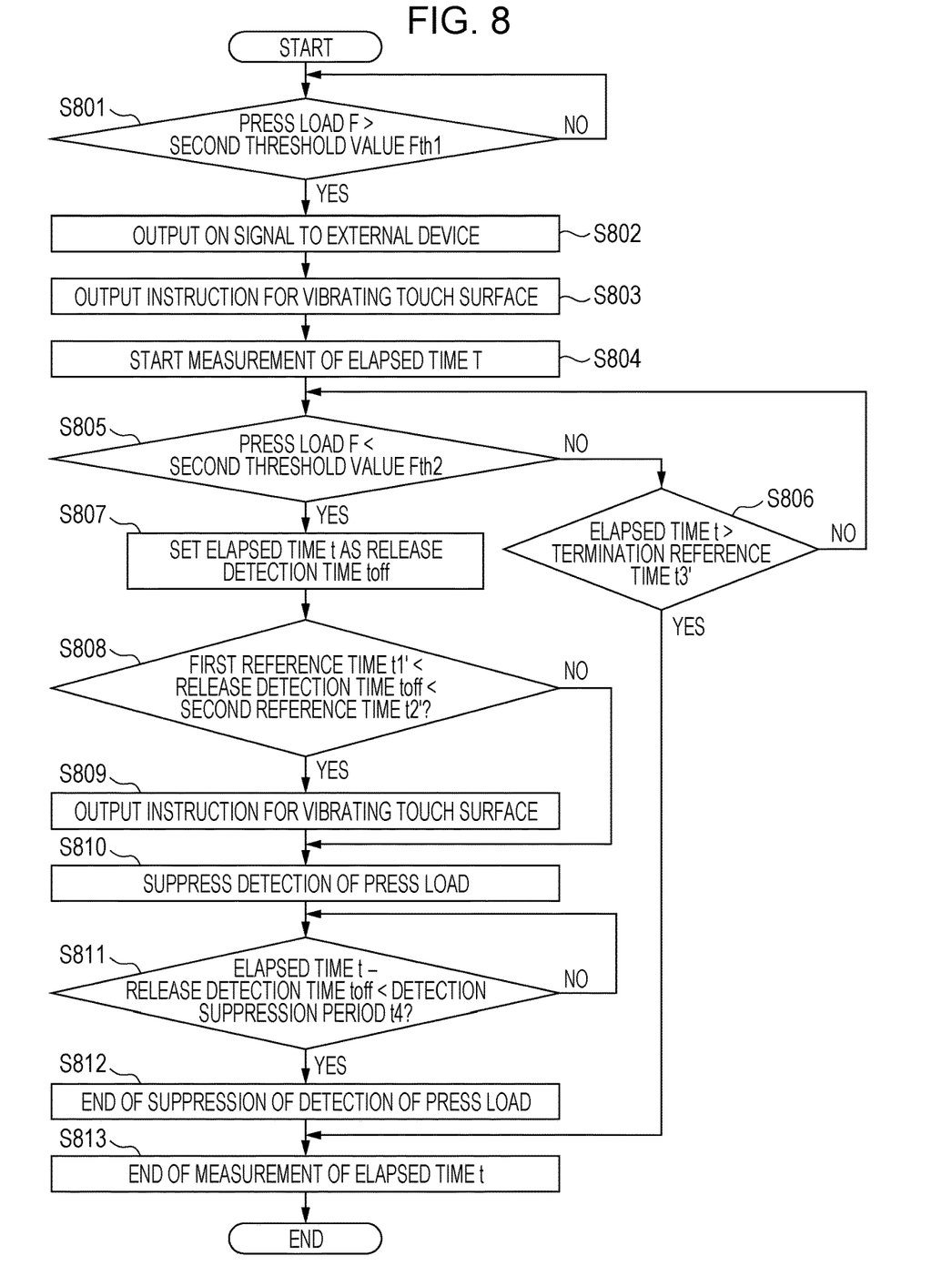
FIG. 8 is a flowchart of overall control performed by a controller according to the second embodiment.

FIG. 8 is a flowchart of overall control performed by the controller 104 according to this embodiment.

First, the controller 104 determines whether the press load F detected by the load detector 102 exceeds the first threshold value Fth1 (S801). The controller 104 repeats the process in S801 again when determining that the press load F is equal to or smaller than the first threshold value Fth1 (S801: No).

On the other hand, when determining that the press load F exceeds the first threshold value Fth1 (S801: Yes), the controller 104 outputs an ON signal to the external device indicating that a predetermined region (first switch region SW1, second switch region SW2, or third switch region SW3) corresponding to information on a position in which the press load F is detected has been pressed (S802).

The controller 104 outputs an instruction for vibrating the touch surface 111 to the vibration applying section 103 (S803). Accordingly, the vibration applying section 103 vibrates the touch surface 111 in response to the input instruction.

The controller 104 causes the timer section 106 to start measuring the elapsed time t (S804).

The controller 104 determines whether the press load F detected by the load detector 102 falls below the second threshold value Fth2 (S805). When determining that the press load F is equal to or greater than the second threshold value Fth2 (not less than the second threshold value Fth2) (S805: No), the controller 104 determines whether the elapsed time t exceeds the termination reference time t3' (S806).

Then, when determining that the elapsed time t exceeds the termination reference time t3' (S806: Yes), the controller 104 terminates the measurement of the elapsed time t by the timer section 106 (S813) and terminates the process. On the other hand, when determining that the elapsed time t does not exceed the termination reference time t3' (S806: No), the controller 104 returns the process to S805.

Also, in S805, when determining that the press load F has fallen below the second threshold value Fth2 (S805: Yes), the controller 104 sets the elapsed time t when it is determined that the press load F has fallen below the second threshold value Fth2 as a release detection time toff (S807).

Then, the controller 104 determines whether an inequation "first reference time t1'<release detection time toff<second reference time t2'" is satisfied (S808). When it is determined that the inequation "first reference time t1'<release detection time toff<second reference time t2'" is not satisfied (S808: No), the process proceeds to S810.

On the other hand, when determining that the inequation "first reference time t1'<release detection time toff<second reference time t2'" is satisfied (S808: Yes), the controller 104 outputs an instruction for vibrating the touch surface 111 to the vibration applying section 103 (S809). As a result, the vibration applying section 103 vibrates the touch surface 111.

For the subsequent process, by performing the same process as S610 to S613 in FIG. 6 of the first embodiment, the measurement of the elapsed time t performed by the timer section 106 is terminated (S810 to S813), and the process is finished.

In the input device 100 according to this embodiment, the press load is determined using two threshold values, that is, the first threshold value Fth1 and the second threshold value Fth2. Specifically, since the first threshold value Fth1 is different from the second threshold value Fth2, when the finger shakes, repetitive detection of the determination of a press and the determination of a release of the press may be suppressed. Thus, in addition to the effect of the first embodiment, the detection accuracy of the operation by the operator may be improved.

In the input device according to the embodiment described above, whether to vibrate is switched according to a timing of a release of a press, so that appropriate tactile feedback may be given to an operation performed by the operator. In addition, in the input device, a next press detection is controlled not to be performed until the detection suppression period elapses after the press is released. As a result, the detection of press repeated a plurality of times may be suppressed even in a situation of finger shaking, or the like. As a result, the input device according to the embodiment described above may suppress vibration control performed a plurality of times, so that tactile feedback (vibration control) in accordance with an intention of the operator may be provided.

Although the embodiment of the present invention has been described above in detail, the present invention is not limited to the embodiment, and various modifications or changes may be made within the scope of the gist of the present invention described in the claims.

This application claims priority based on Japanese Patent Application No. 2021-098884 filed on Jun. 14, 2021, and the entire contents of the application are hereby incorporated herein by reference.

What is claimed is:

1. An input device, comprising:
    a touch sensor;
    a detector configured to detect a load of a press on a touch surface of the touch sensor;
    a vibration applying section configured to vibrate the touch surface;
    a controller configured to issue an instruction for vibrating the touch surface to the vibration applying section when determining that the load detected by the detector exceeds a predetermined press reference; and
    a timer section configured to measure an elapsed time after it is determined that the load exceeds the predetermined press reference, wherein
    the controller is further configured to:
        cause the vibration applying section to not vibrate the touch surface when the controller determines that the load falls below a predetermined release reference and the elapsed time is before a first threshold time;
        cause the vibration applying section to vibrate the touch surface when the controller determines that the load falls below the predetermined release reference and the elapsed time is after the first threshold time and before a second threshold time that is after the first threshold time; and
        cause the vibration applying section to not vibrate the touch surface when the controller determines that the load falls below the predetermined release reference and the elapsed time is after the second threshold time and before a third threshold time that is after the second threshold time.

2. The input device according to claim 1, further comprising:
    a storage configured to store a first vibration mask period from a time, at which the load exceeds the predetermined press reference, to the first threshold time, a vibration control period from the first threshold time to the second threshold time, and a second vibration mask period from the second threshold time to the third threshold time.

3. The input device according to claim 2, wherein
the controller is further configured to cause the timer section to terminate the measurement of the elapsed time when the elapsed time reaches the third threshold time.

4. The input device according to claim 1, wherein
the controller is further configured to not determine, after determining that the load of a first press falls below the predetermined release reference, whether the load of a press immediately after the first press exceeds the predetermined press reference.

5. The input device according to claim 1, wherein a value of the load of a press indicated by the predetermined press reference is equal to a value of the load of a press indicated by the predetermined release reference.

* * * * *